(12) United States Patent
Hupp et al.

(10) Patent No.: US 7,691,933 B2
(45) Date of Patent: Apr. 6, 2010

(54) AQUEOUS PIGMENT PASTES CONTAINING METALLIC PIGMENTS AND THE USE THEREOF FOR PRODUCING SUBSTANCES FOR DECORATIVE AQUEOUS COATINGS

(75) Inventors: Anne Hupp, Kist (DE); Carmen Kunszt, Hammelburg (DE); Holger Sanders, Würzburg (DE)

(73) Assignee: BASF Coatings AG, Munster (DE)

( * ) Notice: Subject to any disclaimer, the term of this patent is extended or adjusted under 35 U.S.C. 154(b) by 154 days.

(21) Appl. No.: 10/522,835

(22) PCT Filed: Aug. 21, 2003

(86) PCT No.: PCT/EP03/09267

§ 371 (c)(1),
(2), (4) Date: Jan. 31, 2005

(87) PCT Pub. No.: WO2004/024837

PCT Pub. Date: Mar. 25, 2004

(65) Prior Publication Data

US 2006/0155022 A1    Jul. 13, 2006

(30) Foreign Application Priority Data

Sep. 2, 2002    (DE) ................. 102 40 972

(51) Int. Cl.
*H01B 3/04* (2006.01)
*C08K 5/00* (2006.01)
*C08L 33/06* (2006.01)

(52) U.S. Cl. ...................... 524/449; 524/219

(58) Field of Classification Search ................. 428/520; 524/219, 432, 522, 549
See application file for complete search history.

(56) References Cited

U.S. PATENT DOCUMENTS

| 3,980,602 A | * | 9/1976 | Jakubauskas | 524/431 |
|---|---|---|---|---|
| 4,089,699 A | * | 5/1978 | Blackburn et al. | 523/200 |
| 4,102,843 A | * | 7/1978 | Sperry et al. | 524/219 |
| 4,243,430 A | * | 1/1981 | Sperry et al. | 524/432 |
| 4,338,239 A | * | 7/1982 | Dammann | 524/549 |
| RE31,936 E | * | 7/1985 | Sperry et al. | 524/522 |
| 6,093,497 A | * | 7/2000 | Wiemann et al. | 428/500 |
| 6,129,989 A | * | 10/2000 | Sapper | 428/500 |
| 6,140,386 A | * | 10/2000 | Vanderhoff et al. | 522/78 |
| 6,235,813 B1 | * | 5/2001 | Brandt et al. | 523/436 |
| 6,284,037 B1 | * | 9/2001 | Sapper | 106/499 |

FOREIGN PATENT DOCUMENTS

| CA | 2154818 | * | 2/1996 |
|---|---|---|---|
| EP | 0 890 620 | | 3/1997 |
| EP | 1 256 603 | | 10/2001 |

* cited by examiner

*Primary Examiner*—Jerry Lorengo
*Assistant Examiner*—Shuangyi Abu Ali
(74) *Attorney, Agent, or Firm*—Cantor Colburn LLP

(57) ABSTRACT

An aqueous pigment paste free from binders and grinding resins, comprising based on its overall amount
(A) from 15 to 40% by weight of at least one metal pigment, especially an aluminum pigment,
(B) from 0.45 to 0.75% by weight of at least one non-associative thickener comprising at least one methacrylate copolymer based on $C_1$-$C_6$ alkyl(meth)acrylate and (meth) acrylic acid,
(C) from 0.1 to 0.4% by weight of at least one organic amine,
(D) from 0.5 to 8% by weight of at least one nonionic surfactant, and
(E) at least 50% by weight of water;
its use for preparing aqueous coating materials, and processes for the preparation.

16 Claims, No Drawings

A QUEOUS PIGMENT PASTES CONTAINING METALLIC PIGMENTS AND THE USE THEREOF FOR PRODUCING SUBSTANCES FOR DECORATIVE AQUEOUS COATINGS

This application is a National Phase Application of Patent Application PCT/EP02003/009267 filed on 21 Aug. 2003, which claims priority to DE 102 40 972.2, filed on 2 Sep. 2002.

The present invention relates to novel aqueous pigment pastes comprising metal pigments, especially aluminum pigments, but free from binders and grinding resins. The present invention further relates to the use of the novel aqueous pigment pastes comprising metal pigments but free from binders and grinding resins for producing aqueous effect coating materials. The present invention additionally relates to a novel process for producing aqueous effect coating materials.

The use of metal or aluminum effect pigments in aqueous basecoat materials is well established.

On account of their comparatively high sensitivity to mechanical effects, however, metal pigments and especially aluminum pigments cause problems on incorporation into aqueous coating materials, especially aqueous basecoat materials.

The metal pigments are normally pasted or dispersed in organic solvents, with or without binders.

A disadvantage is that the pigment pastes in question have only a very limited shelf life of not more than a few days. After that time, settling occurs and inhomogeneities and coagulum are formed, reducing the quality of the multicoat color and/or effect paint systems by clouding, among other phenomena. For industrial coating on the line at the automaker's plant as well, the inadequate shelf life is a major problem. Accordingly, the pigment pastes cannot be produced in sizeable amounts for holding in stock, although this would be desirable on economic grounds. The transport-ability of the pigment pastes also leaves much to be desired. As a result, the possibility of preparing the pigment pastes at one production site with optimum production conditions and transporting them to the customers is closed off. Moreover, for the after-tinting of aqueous basecoat materials, the pigment pastes have to be prepared anew each time.

It is an object of the present invention to provide a novel aqueous pigment paste comprising metal pigments, especially aluminum pigments, which no longer has the disadvantages of the prior art but which instead can be prepared simply, without damage to the mica pigments, transportably, storably, and stably with a minimum level of organic solvents, additives, and polymeric binders. Preferably, the novel aqueous pigment paste comprising metal pigments ought to be storable for up to 3 months without settling and without the formation of inhomogeneities or coagulum.

It ought to be possible to prepare the novel aqueous pigment paste comprising metal pigments at a production site which offers optimum conditions and to transport it to the customers, especially the automakers. Accordingly, the stockholding complexity should be reduced significantly. Moreover, the novel aqueous pigment paste comprising metal pigments ought to be able easily to withstand shearing in the circuits of the coating plants without being damaged.

The novel aqueous pigment paste comprising metal pigments is intended to allow the preparation of storable, transportable aqueous coating materials, especially aqueous basecoat materials, which are stable in shade, stable in effect, and easy to apply, and which give outstanding multicoat color and/or effect paint systems of automobile quality (on this point, see also European patent EP 0 352 298 B 1, page 15 line 42 to page 17 line 40).

The invention accordingly provides the novel aqueous pigment paste comprising metal pigments but free from binders and grinding resins, said paste comprising based on its overall amount (A) from 15 to 40% by weight of at least one metal pigment,
(B) from 0.45 to 0.75% by weight of at least one non-associative thickener comprising at least one methacrylate copolymer based on $C_1$-$C_6$ alkyl(meth)acrylate and (meth)acrylic acid,
(C) from 0.1 to 0.4% by weight of at least one organic amine,
(D) from 0.5 to 8% by weight of at least one nonionic surfactant, and
(E) at least 50% by weight of water, and being referred to below as "pigment paste of the invention".

The pigment paste of the invention may further comprise any of the additives and further constituents commonly used in pigment pastes and/or coating materials.

The invention also provides for the novel use of the pigment paste of the invention for producing aqueous effect, especially color and effect, coating materials, referred to below as "inventive use".

The invention provides not least the novel process for preparing an aqueous effect or color and effect coating material by mixing at least one pigment paste with at least one aqueous mixing varnish comprising at least one water-soluble and/or -dispersible binder and homogenizing the resulting mixture, which involves mixing at least one pigment paste of the invention with the mixing varnish in an amount such that the resulting aqueous effect or color and effect coating material comprises based on its overall amount from 0.1 to 6% by weight of at least one metal pigment (A),
from 0.05 to 2% by weight of at least one non-associative thickener (B) comprising at least one methacrylate copolymer based on $C_1$-$C_6$ alkyl(meth)acrylate and (meth)acrylic acid, and
from 0.02 to 2.4% by weight of at least one nonionic surfactant (D).

The novel process for preparing an effect coating material is referred to below as "process of the invention".

In the light of the prior art it was surprising and unforeseeable for the skilled worker that the object on which the present invention was based could be achieved by means of the pigment paste of the invention without the occurrence of the disadvantages of the prior art, depicted at the outset.

The pigment paste of the invention was simple to prepare without damage to the metal pigments. It was substantially or entirely free from organic solvents, binders, and grinding resins. Additionally, only comparatively small amounts of additives were needed. Despite this, the pigment paste of the invention was surprisingly stable, transportable, and storable. A particular surprise was that the pigment paste of the invention was storable for up to 3 months without settling and without the formation of inhomogeneities or coagulum.

The pigment paste of the invention could be prepared at a production site offering optimum conditions, and transported to the customers, especially the automakers. In this way it was possible to reduce significantly the complexity of stockholding for the customer. Moreover, the pigment paste of the invention could be sheared in the circuits of the coating plants readily without being damaged.

Surprisingly, the pigment paste of the invention gave storable, transportable aqueous coating materials, especially aqueous basecoat materials, which were stable in shade, stable in effect, and easy to apply.

The aqueous basecoat materials allowed the production of outstanding multicoat effect, or color and effect, paint systems of automobile quality. According to European patent EP 0 352 298 B 1, page 15 line 42 to page 17 line 14, this means that the multicoat paint systems in question had (1) high gloss,
(2) high distinctiveness of image,
(3) high and uniform hiding power,
(4) uniform dry film thickness,
(5) high gasoline resistance,
(6) high solvent resistance,
(7) high acid resistance,
(8) high hardness,
(9) high abrasion resistance,
(10) high scratch resistance,
(11) high impact strength,
(12) high intercoat adhesion and adhesion to the substrate, and
(13) high weathering stability and UV resistance.

The pigment paste of the invention is free from binders and grinding resins. Regarding the term "binders", refer to Römpp Lexikon Lacke und Druckfarben, Georg Thieme Verlag, Stuttgart, New York, 1998, "Binders", pages 73 and 74. Grinding resins are used for dispersing pigments (cf. Römpp Lexikon Lacke und Druckfarben, Georg Thieme Verlag, Stuttgart, New York, 1998, "Dispersing", page 34) for the purpose of preparing pigment pastes or pigment preparations (cf. Römpp Lexikon Lacke und Druckfarben, Georg Thieme Verlag, Stuttgart, New York, 1998, "Pigment preparations", page 452). They are binders whose capacity for dispersing pigments is particularly high.

In the context of the present invention, "free from binders and grinding resins" means that the pigment paste of the invention contains no binders and no grinding resins or only amounts thereof so small that they do not characterize, and in particular do not adversely affect, the performance properties of the pigment paste of the invention.

With preference, the pigment paste of the invention is also free from organic solvents. This means that the pigment paste of the invention contains only amounts of organic solvents so small that they do not characterize, and in particular do not adversely affect, the performance properties of the pigment paste of the invention. The amount of organic solvents, based on the pigment paste of the invention, is preferably below 10%, more preferably below 5%, and with particular preference below 1% by weight, and in particular is below the detection limit of the organic solvents.

The pigment paste of the invention comprises at least one metal pigment (A) and preferably at least two, more preferably at least three and in particular two, metal pigments (A). By metal pigments are meant finely divided metallic pigments, usually in the form of flakes, which are commercialized as powders or pigment pastes. A distinction is made between metallic pigments and those metal effect pigments which fulfill functional roles, e.g., in corrosion protection, as conductive pigments, or for protecting against electromagnetic radiation (EMI shielding); see the table. Besides the metallic pigments in flake form there are dusts comprising spherical particles (zinc dust, lead dust) and the dendritic copper powder (cf. Römpp Lexikon Lacke und Druckfarben, Georg Thieme Verlag, Stuttgart, New York, 1998, p. 381 "metal pigments").

Overview of Metal Pigments

| Metallic pigments | Functional pigments |
|---|---|
| Aluminum pigments | Lead dust |
| Gold bronzes | Zinc dust |
|  | Copper powders |
|  | Zinc pigments |
|  | Conductive pigments |

In the pigment paste of the invention, based on its overall amount, the metal pigments (A) are present in an amount of from 15 to 40% by weight and in particular 22% by weight. Advantageously, they are aluminum pigments.

Aluminum pigments (aluminum bronze, silver bronze) are metallic pigments in flake form which are produced from foundry aluminum of minimum purity 99.5% (DIN EN 573-3; 1994-12) or pure aluminum of minimum purity 99.95% by the Hall or Hametag process. Aluminum pigments are used to provide an effect (metallic effect), for example, in automotive topcoats, hammer finishes, chrome effect finishes, and other effect coatings, and also in printing inks. They are also used, however, as functional pigments in corrosion protection coatings (barrier effect), reflective coating materials, and other specialty fields. One relatively new development relates to effect pigments wherein the aluminum flake is coated with a thin iron oxide layer (iron oxide-aluminum pigments). As a result of interference at this layer, the metallic effect is accompanied by a color effect (cf. Römpp Lexikon Lacke und Druckfarben, Georg Thieme Verlag, Stuttgart, New York, 1998, p. 24 "Aluminum pigments").

The pigment paste of the invention may further comprise at least one pigment other than the metal pigments (A), selected preferably from the group consisting of organic and inorganic pigments, color pigments, optical effect pigments, electrically conductive pigments, magnetic pigments, magnetically shielding pigments, fluorescent pigments, phosphorescent pigments, anticorrosion pigments, and extender pigments, pigments having at least two of these properties, and nanoparticles, provided such an additional pigment does not adversely affect the performance properties of the pigment paste of the invention. With preference, the pigment paste of the invention contains no further pigment.

Based on its overall amount, the pigment paste of the invention contains from 0.45 to 0.75% by weight, in particular from 0.5 to 0.7% by weight, of at least one, especially one, nonassociative thickener comprising at least one methacrylate copolymer based on $C_1$-$C_6$ alkyl(meth)acrylate and (meth)acrylic acid, especially methacrylic acid. The thickener (B) preferably contains in copolymerized form at least two different $C_1$-$C_6$ alkyl(meth)acrylate monomers. Based on its overall amount it contains more preferably from 40 to 60% by weight of methacrylic acid in copolymerized form. The thickener (B) is used preferably in the form of an aqueous dispersion. With particular preference, use is made of the dispersions of thickeners (B) such as are described, for example, in German patent applications DE 196 52 842 A 1, column 3 line 42 to column 4 line 4, or DE 197 41 554 A 1, column 2 line 54 to column 3 line 15. Very particular preference is given to using an aqueous dispersion of the thickener (B) which is sold under the brand name Viscalex® HV 30 by Allied and has a thickener (B) content of 30% by weight.

Based on its overall amount, the pigment paste of the invention contains from 0.1 to 0.4% by weight, in particular from 0.2 to 0.3% by weight, of at least one, especially one, organic amine (C). The amine (C) is preferably selected from the group of the tertiary amines, preferably of the tertiary alkylamines, and especially of the tertiary hydroxyalkylamines. Examples of suitable tertiary hydroxyalkylamines are triethanolamine, methyldiethanolamine, and dimethylethanolamine, especially dimethylethanolamine.

Based on its overall amount, the pigment paste of the invention further contains from 0.5 to 8% by weight, in particular 0.61% by weight, of at least one nonionic surfactant. Suitable nonionic surfactants (cf. Römpp Lexikon Lacke und Druckfarben, Georg Thieme Verlag, 1998, page 410, "Nonionic surfactants") in accordance with the invention are surfactants whose hydrophyllicity is brought about by polyether chains, hydroxyl groups, carboxamido groups, urethane groups and/or ester groups. Nonionic surfactants are commercial products and are sold, for example, under the brand name Tegodispers® 740 by Tego, under the brand name Hydropalat® 3037 by Cognis, or under the brand name Setalux® 6802 AQ 4 by Akzo. Preference is given to using Tegodispers® 740 and Hydropalat® 3037. Hydropalat® 3037 is a silicone-free surface-active leveling additive for aqueous systems, with a hydroxyl number of from 73 to 83 mg KOH/g and a hydrolysis number (DGF C-V 3) of from 56 to 62. Tegodispers® 740 is a nonionic modified fatty acid derivative free from aromatics, amine, and nonylphenol ethoxylate. Surfynol is especially suitable.

Based on its overall amount, the pigment paste of the invention not least contains at least 50% by weight and preferably at least 52%, with particular preference at least 54% by weight of water.

The pigment paste of the invention may further comprise customary and known additives, such as customary coatings additives. It is, however, a particular advantage of the pigment paste of the invention that it need not contain any further additives in order to achieve the advantages according to the invention.

The preparation of the pigment pastes of the invention requires no peculiarities in terms of method but instead takes place in accordance with the customary and known methods of preparing pigment pastes or pigment formulations by mixing of the above-described ingredients in appropriate mixing equipment such as stirred tanks, dissolvers, Ultraturrax, inline dissolvers, stirred mills, bead mills or extruders. The skilled worker is aided on the basis of his or her general art knowledge to select the techniques and equipment in such a way that the particular metal pigments (A) to be dispersed are not damaged.

In accordance with the invention, the pigment paste of the invention is used for preparing aqueous effect, or color and effect, coating materials, especially aqueous basecoat materials.

For this purpose, the pigment paste of the invention is mixed with at least one aqueous mixing varnish and then the resulting mixture is homogenized. This is preferably carried out using the techniques and equipment described above.

The mixing varnish comprises at least one water-soluble and/or -dispersible binder. The binder is preferably selected from the group consisting of random, alternating, and block, linear, branched, and comb addition (co)polymers of ethylenically unsaturated monomers or polyaddition resins and/or polycondensation resins. Regarding these terms, refer to Römpp Lexikon Lacke und Druckfarben, Georg Thieme Verlag, Stuttgart, New York, 1998, page 457, "Polyaddition" and "Polyaddition resins (polyadducts)", and also pages 463 and 464, "Polycondensates", "Polycondensation" and "Polycondensation resins", and also pages 73 and 74, "Binders".

The addition (co)polymers of ethylenically unsaturated monomers are preferably selected from the group consisting of (meth)acrylate (co)polymers and partially hydrolyzed polyvinyl esters, especially (meth)acrylate copolymers, and the polyaddition resins and/or polycondensation resins are preferably selected from the group consisting of polyesters, alkyds, polyurethanes, polylactones, polycarbonates, polyethers, epoxy resin-amine adducts, polyureas, polyamides, polyimides, polyester-polyurethanes, polyether-polyurethanes, and polyester-polyether-polyurethanes, especially polyester-polyurethanes.

Very particular preference is given to using the binders such as are employed in customary and known aqueous basecoat materials. Binders of this kind are described, for example, in German patent application DE 196 52 842 A 1, column 2 line 53 to column 3 line 46, and in German patent application DE 199 14 896 A 1, column 5 line 34 to column 11 line 5.

The binders are used in the mixing varnish in the amounts which are customary and known for aqueous basecoat materials.

The mixing varnish may further comprise customary and known crosslinking agents, and additives in the customary and known amounts such as are described, for example, in German patent application DE 199 14 896 A 1, column 11 line 6 to column 16 line 16.

It is essential that in the process of the invention the pigment paste of the invention is used in an amount such that the resulting aqueous effect, or color and effect, coating material contains based on its overall amount from 0.1 to 6% by weight of at least one of the metal pigments (A), from 0.05 to 2% by weight of at least one of the nonassociative thickeners (B) comprising at least one methacrylate copolymer based on $C_1$-$C_6$ alkyl(meth)acrylate and (meth)acrylic acid, and from 0.02 to 2.4% by weight of at least one of the nonionic surfactants (D).

The resulting aqueous coating materials, especially the aqueous basecoat materials, may be curable physically, thermally with self-crosslinking and/or external cross-linking, with actinic radiation, or thermally and with actinic radiation. By actinic radiation is meant near infrared (NIR), visible light, UV radiation or X-rays, especially UV radiation, and also corpuscular radiation, such as electron beams. Conjoint thermal curing and curing with actinic radiation is also referred to by those in the art as dual cure.

The aqueous basecoat materials are preferably used for producing multicoat effect, or color and effect, paint systems on primed and unprimed substrates.

Suitable substrates include all surfaces to be coated which are not damaged by curing of the coating systems present thereon using heat or heat and actinic radiation. Suitable substrates consist, for example, of metals, plastics, wood, ceramic, stone, textile, fiber composites, leather, glass, glass fibers, glass wool, rock wool, mineral-bound and resin-bound building materials, such as plasterboard and cement slabs or roof shingles, and also combinations of these materials. The surfaces of these materials may have already been painted or coated.

Accordingly, the aqueous basecoat materials are especially suitable for painting motor vehicle bodies and parts thereof, the interior and exterior of motor vehicles, the interior and exterior of buildings, doors, windows, and furniture, and, in the context of industrial coating, for the painting of parts made of plastic, especially transparent plastics parts, small parts, coils, containers, packaging, electrical components, and white goods, and also for the coating of hollow glassware.

The aqueous basecoat materials are very suitable indeed for the original (OEM) finishing and refinish of motor vehicles, especially automobiles.

In the case of electrically conductive substrates, primers can be used, which are produced in a customary and known manner from electrocoat materials. Both anodic and cathodic electrocoat materials are suitable for this purpose, but especially cathodic electrocoats.

The coating of the invention may also be used to paint primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (codes according to DIN 7728T1) and polymer blends thereof, or the fiber reinforced composite materials produced using these plastics.

Nonfunctionalized and/or apolar substrate surfaces may be subjected prior to coating in a known manner to a pretreatment, such as with a plasma or by flaming, or provided with a hydro primer.

The multicoat paint systems may be produced in a variety of ways. Preference is given to the wet-on-wet techniques described in German patent application DE 199 30 664 A 1, page 15 lines 36 to 58, or in German patent application DE 199 14 896 A 1, column 2 line 15 to column 3 line 24 and column 16 line 54 to column 18 line 54.

This is done using the customary and known techniques and equipment for the application and curing of coating materials, especially aqueous coating materials.

Owing to the outstanding distribution of the metal pigments (A) in the pigment paste of the invention, and its storage stability, the end results are multicoat paint systems of outstanding shade stability and stability of the optical effects. The multicoat paint systems may therefore be used with advantage for the OEM finishing and refinish of top-class automobiles. The coating materials of the invention advantageously contain based on their total amount between 0.25 and 20% by weight of pigment paste.

EXAMPLE

Preparation of a Pigment-Free Coating Composition B1

57.4 kg of an aqueous binder mixture were combined with 12.3 kg of an aqueous melamine resin suspension and 1.8 kg of an acrylic resin addition.

This mixture was then further admixed with a total of 6 kg of customary additives, 1 kg of a commercially customary flatting paste, and 3 kg of a talc paste, and the components were intimately mixed. Finally, 4.5 kg of water and 0.5 kg of polyurethane thickener were added and the mixture was again stirred.

Preparation of an Inventive Pigment Paste B2

The pigment paste of the invention was prepared as follows (the % are by weight):

First of all, 1.8 kg of water (15%) were mixed with 0.21 kg of Viscalex HV30 (1.75%). Then a further 4.68 kg of water (39%) were added, followed by 0.26 kg of 10% strength dimethylethanolamine solution (2.17%). After that, 0.7 kg of surfynol (5.83%) and 0.25 kg of Hydropalat 3037 (2.1%) were added.

The whole mixture was then stirred for 20 minutes. Thereafter, 4.1 kg of 65% chromated aluminum paste (34.15%) were added and the resultant mixture was stirred for a further 30 minutes.

Preparation of a Pigmented Coating Composition B3

12% by weight of the inventive pigment paste B2 were added to 86% by weight of the pigment-free coating composition B1 and the two constituents were mixed thoroughly with the addition of 2 kg of water (2%).

The resulting pigmented coating composition was substantially free from solvents, had very good transport properties, and exhibited an outstanding stability on storage.

What is claimed is:

1. An aqueous pigment paste that is stable, transportable, and storable for up to three months, comprising
    (A) from 15 to 40% by weight of at least one metal pigment,
    (B) from 0.45 to 0.75% by weight of at least one nonassociative thickener comprising at least one methacrylate copolymer based on $C_1$-$C_6$ alkyl (meth)acrylate and (meth)acrylic acid,
    (C) from 0.1 to 0.4% by weight of at least one organic amine,
    (D) from 0.5 to 8% by weight of at least one nonionic surfactant, and
    (E) at least 50% by weight of water,
based on total weight, wherein the aqueous pigment paste is free from binders, including grinding resins used for dispersing pigments, wherein the aqueous pigment paste is usable for producing an aqueous coating material by mixing the aqueous pigment paste with at least one aqueous mixing varnish comprising at least one water-soluble, water-dispersible, or water-soluble and water-dispersible binder.

2. The paste of claim 1, wherein the thickener (B) comprises in copolymerized form at least two different $C_1$-$C_6$ alkyl (meth)acrylate monomers.

3. The paste of claim 1, wherein the thickener (B), based on its total weight, comprises from 40 to 60% by weight of methacrylic acid in copolymerized form.

4. The paste of claim 1, wherein the organic amine (C) is selected from the group consisting of tertiary amines.

5. The paste of claim 4, wherein the tertiary amine (C) is selected from the group consisting of hydroxyalkylamines.

6. The paste of claim 5, wherein the hydroxyalkylamine (C) is dimethylethanolamine.

7. The paste of claim 1, wherein the metal pigment (A) comprises an aluminum pigment.

8. The paste of claim 1, comprising at least 52% by weight of water, based on total weight.

9. The paste of claim 1, comprising
    (A) 34% by weight of an aluminum pigment,
    (B) 0.53 by weight of a nonassociative thickener comprising at least one methacrylate copolymer based on $C_1$-$C_6$ alkyl (meth)acrylate and (meth)acrylic acid,
    (C) 0.22% by weight of an organic amine,
    (D) 0.61% by weight of a nonionic surfactant, and
    (E) 54% by weight of water,
based on total weight.

10. A method of preparing a coating material, comprising adding an aqueous pigment paste free from binders and grinding resins, as claimed in claim 1, to prepare an aqueous coating material comprising the metal pigment.

11. The method of claim 10, wherein the aqueous coating materials are aqueous basecoat materials.

12. A method for making a multicoat paint system, comprising applying the aqueous coating material of claim 10 to a substrate.

13. A process for preparing an aqueous coating material comprising at least one effect pigment, comprising mixing at least one pigment paste with at least one aqueous mixing varnish comprising at least one water-soluble and/or -dispersible binder and homogenizing the resulting mixture, wherein the at least one pigment paste comprises at the least one aqueous pigment paste free from binders and grinding resins, as claimed in claim 1, and is used in an amount such that the resulting mixture from 0.1 to 6% by weight of at least one metal pigment (A), and from 0.02 to 2.4% by weight of at least one nonionic surfactant (D), based on total weight.

14. The process of claim 13, wherein the binder is selected from the group consisting of random (co)polymers, alternating (co)polymers, block (co)polymers, linear (co)polymers, branched (co)polymers, comb addition (co)polymers, (co)polymers comprising ethylenically unsaturated monomers, polyaddition resins, polycondensation resins, and combinations comprising at least two of the foregoing.

15. The process of claim 14, comprising at least one member selected from addition (co)polymers of ethylenically unsaturated monomers selected from the group consisting of (meth)acrylate (co)polymers, partially hydrolyzed polyvinyl esters; polyaddition resins selected from the group consisting of polyesters, alkyds, polyurethanes, polylactones, polycarbonates, polyethers, epoxy resin-amine adducts, polyureas, polyamides, polyimides, polyester-polyurethanes, polyether-polyurethanes, polyester-polyether-polyurethanes and combinations of at least two of the foregoing; polycondensation resins selected from the group consisting of polyesters, alkyds, polyurethanes, polylactones, polycarbonates, polyethers, epoxy resin-amine adducts, polyureas, polyamides, polyimides, polyester-polyurethanes, polyether-polyurethanes, polyester-polyether-polyurethanes and combinations of at least two of the foregoing; and combinations of at least two of the foregoing.

16. An aqueous pigment paste that is stable, transportable, and storable for up to three months, comprising
(A) from 15 to 40% by weight of at least one aluminum metal pigment,
(B) from 0.45 to 0.75% by weight of at least one nonassociative thickener comprising at least one methacrylate copolymer based on $C_1$-$C_6$ alkyl
(meth)acrylate and from 40 to 600% by weight of (meth)acrylic acid in copolymerized form, based on the total weight of the nonassociative thickener,
(C) from 0.1 to 4% by weight of at least one organic amine,
(D) from 0.5 to 8% by weight of at least one nonionic surfactant, and
(E) at least 50% by weight of water,
based on total weight, wherein the aqueous pigment paste is free from grinding resins used for dispersing pigments, and other binders, wherein the aqueous pigment paste is usable for producing aqueous coating materials by mixing the aqueous pigment paste with at least one aqueous mixing varnish comprising at least one water-soluble, water-dispersible, or water-soluble and water-dispersible binder.

* * * * *